: # 2,751,385

VAT DYES

Aaron Oken, Newark, Del., assignor to E. I. du Pont de Nemours and Company, Wilmington, Del., a corporation of Delaware No Drawing. Application February 28, 1955,
Serial No. 491,175

5 Claims. (Cl. 260—262)

This invention relates to vat dyes of the quinoxaline series, and more particularly to the compound having the general formula:

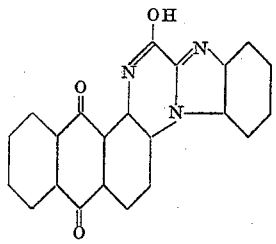

and its halogenated and methoxy derivatives.

The 14 - hydroxybenzimidazo[1,2-a]naphtho[2,3-f]-quinoxaline-7,12-dione as formulated above is a structurally new dye in the field of anthraquinone vat dyes which, as illustrated in the following examples, can be halogenated or converted to the methoxy derivative since it has a free OH group.

It is therefore an object of the present invention to produce structurally new vat dyes which dye cotton from the usual alkaline hydrosulfite vat in scarlet and yellow shades having relatively good fastness properties.

I have found that, where 2,3-dihydroxynaphtho[2,3-f] quinoxaline-7,12-dione is reacted with anthranilic acid in the presence of boric acid, condensation takes place between the hydroxy group in the 3-position together with ring closure and a splitting off of carbon dioxide, giving the 14-hydroxybenzimidazo[1,2-a]naphtho[2,3-f]-quinoxaline-7,12-dione having the structural formula illustrated above. The reaction is preferably carried out in the presence of solvent such as phenol, and, as illustrated in Example 2, these new products may be prepared directly from the 1,2-diaminoanthraquinone which as the first step in the reaction is reacted with anhydrous oxalic acid to produce the 2,3-dihydroxynaphtho[2,3-f]quinoxaline-7,12-dione.

The 14 - hydroxybenzimidazo[1,2 - a]naphtho[2,3 - f]-quinoxaline-7,12-dione may be directly halogenated with a halogen such as bromine or chlorine in organic solvents, and the introduction of one or two atoms of bromine or chlorine converts the bright scarlet dye to golden yellow. On the methylation of the hydroxyl group of the parent dye with usual methylating agents such as dimethyl sulfate in a solvent, the methoxy derivative is obtained which dyes in similar shades and has similar fastness properties to the parent dye.

The following examples are given to illustrate the invention. The parts used are by weight.

Example 1

A mixture of 3 parts of 2,3-dihydroxy naphtho[2,3-f]-quinoxaline-7,12-dione, 11 parts of anthranilic acid, 3 parts of boric acid and 30 parts of phenol is heated with agitation for 6 hours at 160° to 170° C. The mixture is then cooled, filtered, and the product washed with ethanol, yielding 2 parts of dark red crystals which melt at approximately 340° C. with sublimation. On examination of this product the infrared spectrum shows a band for an OH group but no band for NH. The compound is characterized crystallographically by the space group $P_{2_1}/a$ (Hermann-Mauguin symbol), and belongs to the monoclinic system with the following cell parameters:

$a = 19.718 \pm .050$ A.
$b = 5.097 \pm .013$ A.
$c = 16.262 \pm .034$ A.
Beta $= 95.50 \pm 0.08°$ There are 4 molecules per unit cell, the crystal density is approximately 1.46 and the molecular weight is $361 \pm 5$. Elemental analysis gives an empirical formula of $C_{22}H_{11}N_3O_3$ On the basis of these data, the compound is considered to have the formula:

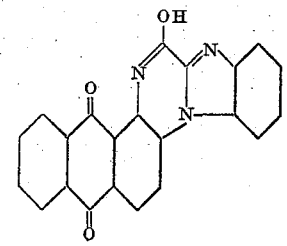

14-hydroxybenzimidazo[1,2-a]naphtho[2,3-f]quinoxaline-7,12-dione

This compound gives a red vat and dyes cotton in very light-fast scarlet shades.

Example 2

This compound may be prepared directly from 1,2-diaminoanthraquinone, as follows:

A mixture of 50 parts of 1,2-diaminoanthraquinone, 100 parts of anhydrous oxalic acid and 250 parts of phenol is agitated and heated at 135° to 140° C. for 1.5 hours, followed by 30 minutes of heating at reflux. The mixture is cooled to 150° C. and 60 parts of anthranilic acid and 15 parts of boric acid are added. After 6 hours of refluxing, another 60 parts of anthranilic acid is added and the mixture again refluxed for 6 hours or until examination of the mixture shows no further increase in the red crystalline product. On cooling the mixture, filtering, and washing with ethanol, a crude product is obtained which can be recrystallized from nitrobenzene to give approximately 21 parts of red needles identical with the product prepared in Example 1.

Example 3

An agitated suspension of 21 parts of the red dye (prepared as in Example 1) in 240 parts of nitrobenzene is treated with 18 parts of bromine at room temperature and the mixture is then heated during 1 hour to 90° C., during another hour to 120° C., and finally for 1 hour at 145° to 150° C. The mixture is then cooled, filtered and washed with ethanol to give 26 parts of yellowish red crystals melting at approximately 320° C. after recrystallization from nitrobenzene. The product thus obtained analyzes 23.4% bromine, which indicates that it is a mixture of mono- and dibrominated material and is predominantly monobrominated. The compound gives a red-brown vat and dyes cotton in bright, strong golden yellow shades having very high light-fastness.

Example 4

A suspension of 3.7 parts of the red dye of Example 1 in 48 parts of nitrobenzene is heated to 140° to 150° C. for 1 hour, cooled to room temperature and then treated with 13.3 parts of sulfuryl chloride. After 2 hours at reflux (70° to 80° C.) the reaction mass is cooled, and filtered to give a bright orange solid which contains 16.1% Cl, which corresponds to the formula $C_{22}H_9N_3O_3Cl_2$. The dichloro compound melts at 330° to 336° C. and dyes cotton in bright, very light-fast golden yellow shades from a reddish vat.

The monochloro compound was isolated from the filtrates when the crude dichlorinated compound of this example was recrystallized from a mixture of "Cellosolve" (2-ethoxy-ethanol) and monochlorobenzene. The monochloro derivative is formed in small amounts by the procedure that gives predominantly dichlorinated material. The monochloro compound is somewhat more difficult to vat than the dichloro but, like the dichloro, also dyes in golden yellow shades.

*Example 5*

A mixture of 5 parts of the red dye of Example 1, 13 parts of 30% aqueous sodium hydroxide, 24 parts of "Cellosolve" and 6.5 parts of dimethylsulfate is well agitated. The mixture initially becomes warm and then gradually cools again to room temperature. Dimethylsulfate (1.5 parts) is then added and the mixture is heated to reflux (100° C.) for a few minutes. After cooling and filtering, the product is obtained as bright red crystals. This product shows no OH or NH bands in the infrared spectrum, and its melting point is above 400° C. The material dyes cotton in bright, light-fast scarlet shades from a dark red-brown vat. It is considered to have the structure:

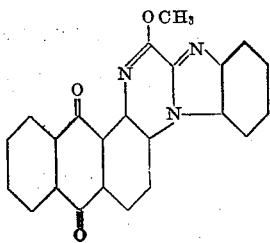

14-methoxybenzimidazo[1,2-a]naphtho[2,3-f]quinoxaline-7,12-dione

The dyes obtained in the above examples show excellent light fastness, and on the AATCC No. 4 wash test scale of 1 to 5, where 5 indicates no change, they have a fastness of from 2 to 4 as illustrated in the following table:

| Ex. | Product | Hue | No. 4 Wash | | Light Fastness |
|---|---|---|---|---|---|
| | | | S | SC | |
| 1 | Unsubstituted. | Bright Scarlet | 2-3 | 2 | 7-8 |
| 3 | Br₁₋₂ | Golden Yellow | 3-4 | 2 | 8 |
| 4 | Cl₂ | Bright Golden Yellow | 4 | 2 | 7 |
| 5 | OCH₃ | Bright Scarlet | 2-3 | 2 | 7-8 |

I claim:
1. Compounds of the group consisting of 14-hydroxybenzimidazo[1,2-a]naphtho[2,3-f] - quinoxaline - 7,12-dione having the formula:

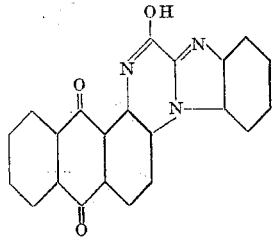

its mono and dibrominated, mono and dichlorinated and 14-methoxy derivatives.

2. 14 - hydroxybenzimidazo[1,2-a]naphtho[2,3-f] - quinoxaline-7,12-dione.

3. The chlorinated 14-hydroxybenzimidazo[1,2-a]naphtho[2,3-f]-quinoxaline - 7,12 - dione containing up to 2 atoms of chlorine.

4. The brominated 14 - hydroxybenzimidazo[1,2-a]naphtho[2,3-f]-quinoxaline-7,12-dione containing up to 2 atoms of bromine.

5. 14-methoxybenzimidazo[1,2-a]naphtho[2,3-f]quinoxaline-7,12-dione.

No references cited.